(12) United States Patent
Hooghoudt

(10) Patent No.: US 12,552,498 B2
(45) Date of Patent: Feb. 17, 2026

(54) TELESCOPIC GANGWAY, A MOTION COMPENSATED GANGWAY, A VESSEL, AN OFFSHORE STRUCTURE, AND A METHOD

(71) Applicant: Ampelmann Holding B.V., Delft (NL)

(72) Inventor: Marijn Jaap Anton Maria Hooghoudt, Delft (NL)

(73) Assignee: Ampelmann Holding B.V., Delft (NL)

( * ) Notice: Subject to any disclaimer, the term of this patent is extended or adjusted under 35 U.S.C. 154(b) by 946 days.

(21) Appl. No.: 17/577,441

(22) PCT Filed: Jul. 17, 2020

(86) PCT No.: PCT/NL2020/050475
§ 371 (c)(1),
(2) Date: Jan. 18, 2022

(87) PCT Pub. No.: WO2021/015612
PCT Pub. Date: Jan. 28, 2021

(65) Prior Publication Data
US 2025/0171112 A1     May 29, 2025

(30) Foreign Application Priority Data
Jul. 19, 2019   (NL) ........................... 2023540

(51) Int. Cl.
B63B 27/14      (2006.01)
(52) U.S. Cl.
CPC ........ B63B 27/14 (2013.01); *B63B 2027/141* (2013.01)
(58) Field of Classification Search
CPC ............................................... B63B 2027/141
See application file for complete search history.

(56) References Cited

U.S. PATENT DOCUMENTS 4,473,916 A * 10/1984 Connold ................. B63B 27/14
                                                                14/42
5,596,936 A *  1/1997 Bullock ................. B61D 3/187
                                                                105/458
(Continued)

FOREIGN PATENT DOCUMENTS

CN        201704619 U  *  1/2011
CN        207737458 U  *  8/2018
(Continued)

OTHER PUBLICATIONS

International Search Report and Written Opinion—PCT/NL2020/050475—mailing date Sep. 15, 2020.

*Primary Examiner* — Christopher J Sebesta
*Assistant Examiner* — Katherine J Chu
(74) *Attorney, Agent, or Firm* — Banner & Witcoff, Ltd.

(57) ABSTRACT

A telescopic gangway, comprising a telescopable first and second gangway part, such as a telescoping boom and main boom. The first gangway part has a first walkboard, such as a first grating, and the second gangway part has a second walkboard, such as a second grating, that partially overlaps the first walkboard. The gangway further comprises an angled step unit providing a transition from the first walkboard to the second walkboard, such that the first walkboard, the second walkboard and the angled step unit form an assembled walkboard path. Here, the angled step unit has a first coupling unit, such as a comb plate, that is coupled to the first walkboard for allowing a movement in the longitudinal direction. The angled step unit has also a translating coupling unit that is coupled to the second walkboard, preferably for allowing a movement in a direction transverse to the longitudinal direction.

18 Claims, 4 Drawing Sheets

(56) References Cited

U.S. PATENT DOCUMENTS

| | | | | |
|---|---|---|---|---|
| 5,813,071 | A * | 9/1998 | Breslin | B60P 1/431 14/71.1 |
| 6,079,941 | A * | 6/2000 | Lee | B62B 3/04 414/812 |
| 6,718,902 | B1 * | 4/2004 | Lower | B63B 17/04 14/71.1 |
| 7,255,047 | B1 * | 8/2007 | Coslovi | B61D 3/187 105/355 |
| 8,402,584 | B2 * | 3/2013 | Westermark | B63B 27/143 14/71.3 |
| 8,424,668 | B2 * | 4/2013 | Gonzalez Alemany | B66B 21/10 198/324 |
| 8,566,992 | B1 * | 10/2013 | Stokes | B63B 17/00 114/230.17 |
| 8,960,097 | B2 * | 2/2015 | Fritsche | B66B 21/10 104/53 |
| 9,174,710 | B2 * | 11/2015 | van der Tempel | B66F 7/20 |
| 11,192,616 | B2 * | 12/2021 | Zijlmans | B63B 27/14 |
| 2003/0041792 | A1 * | 3/2003 | Besenzoni | B63B 27/14 14/71.1 |

FOREIGN PATENT DOCUMENTS

| | | | | |
|---|---|---|---|---|
| EP | 1253101 | A1 | 10/2002 | |
| EP | 2457796 | A1 | 5/2012 | |
| EP | 2505486 | A1 | 10/2012 | |
| FR | 1578360 | A * | 8/1968 | B66B 23/10 |
| WO | 2019074365 | A1 | 4/2019 | |

\* cited by examiner

TELESCOPIC GANGWAY, A MOTION COMPENSATED GANGWAY, A VESSEL, AN OFFSHORE STRUCTURE, AND A METHOD

CROSS-REFERENCE TO RELATED APPLICATIONS

This application is a U.S. National Stage application under 35 U.S.C. § 371 of International Application PCT/NL2020/050475 (published as WO 2021/015612 A1), filed Jul. 17, 2020, which claims the benefit of priority to Application NL 2023540, filed Jul. 19, 2019. Benefit of the filing date of these prior applications is hereby claimed. Each of these prior applications is hereby incorporated by reference in its entirety.

The invention relates to a telescopic gangway, in particular a telescopic gangway for providing access to and/or from a vessel.

Telescopic gangways are generally known and are for example used for transferring loads, in particular people, to and/or from a vessel. Typically, telescopic gangways comprise a first part, also referred to as a main boom, and a second part, also referred to as a telescoping boom, that is movable, in particular telescopable, relative to the main boom in a longitudinal direction of the gangway. A distal end or tip of the gangway, in particular a distal end of the telescoping boom, is meant to be held and/or brought in close proximity with e.g. an offshore structure, such as an offshore wind turbine or an oil and gas platform. The tip of the gangway may for instance be connected to the offshore structure or may continuously be held in close proximity to the offshore structure e.g. by a constant pressure force. The telescoping boom can extend and retract in a longitudinal direction of the gangway enabling a flexible way of providing access to the offshore structure. In practice, for instance, a relative motion of the vessel with respect to the offshore structure which is connected to the fixed world, can at least partially be compensated by a telescoping movement between the telescoping boom and the main boom. This telescoping movement occurs e.g. with a certain relative telescoping displacement, velocity and/or acceleration/deceleration.

In an elegant way, the gangway may be provided with a drive and/or one or more telescoping actuators, e.g. hydraulic pistons, in particular a series of telescoping actuators extending along a longitudinal direction of the gangway, for actively moving the distal end of the gangway into engagement with an offshore construction.

In case the telescopic gangway is connected with its tip to the offshore structure, the motions of the vessel dictate the motion of the gangway, in particular the telescoping movement in the longitudinal direction of the gangway. This reactive state of the gangway is also referred to as a free float mode. On the other hand, in case the tip of the gangway is also actively held in close proximity to the offshore structure, the telescoping movement that compensates for the relative motion between the vessel and the offshore structure may partly be imposed by a drive and/or at least one (telescoping) actuator. This way, the telescoping movement of the gangway may be reactively and/or actively controlled.

Under certain circumstances, the telescoping movement, in particular e.g. the displacement, velocity and/or acceleration/deceleration, can hinder the transfer of people and/or loads from the first part, or main boom, to the second part, or telescopic boom, and vice versa. The transfer may e.g. be hindered by sudden shifts in the telescoping movement and/or pivoting movements between the second part and the first part or by relatively fast movements or accelerations between the respective parts. In particular, people using the gangway may experience discomfort due to the occurrence of e.g. relatively high velocities and/or accelerations.

An object of the invention therefore is to provide a telescopic gangway that mitigates at least one of the above mentioned drawbacks, while maintaining or improving ease of transfer of people and/or loads via the gangway.

Thereto, the invention provides a telescopic gangway, comprising a first and second gangway part, for example a telescoping and main boom, which are telescopable with respect to each other in a longitudinal direction to adjust a longitudinal length of the telescopic gangway, wherein the first gangway part has a first walkboard, such as a first grating, and the second gangway part has a second walkboard, such as a second grating, that partially overlaps the first walkboard, the gangway further comprising a angled step unit providing a transition from the first walkboard to the second walkboard, such that the first walkboard, the second walkboard and the angled step unit form an assembled walkboard path, wherein the angled step unit has a first coupling unit, such as a comb plate, that is coupled to the first walkboard for allowing a movement in the longitudinal direction, and wherein the angled step unit has a translating coupling unit that is coupled to the second walkboard, preferably for allowing a movement in a direction transverse to the longitudinal direction.

By providing a angled step unit having a first coupling unit coupled to the first walkboard and a translating coupling unit coupled to the second walkboard, an assembled walkboard path can be realized that improves ease of transfer of people and/or loads via the gangway. Further, by coupling the first coupling unit to the first walkboard for allowing a movement in the longitudinal direction, and coupling the translating coupling unit to the second walkboard, a comfortable and reliable, more or less continuous assembled walkboard path can be formed absorbing relative movements of the first and second walkboards relative to each other in the longitudinal direction.

Preferably, the translating coupling unit is arranged for allowing a movement in a direction transverse to the longitudinal direction, e.g. linearly in an upward, downward or sideward direction or pivotally in a rolling, pitching, and/or yawing motion.

By arranging the first coupling unit for allowing a movement in the longitudinal direction and arranging the translating coupling unit for allowing a movement in a direction transverse to the longitudinal direction, both coupling units can be optimized, e.g. in terms of material, type of construction and/or dimensions for absorbing the respective movements.

Advantageously, the first coupling is arranged for blocking a movement in a direction transverse to the longitudinal direction, thereby minimizing any gap between said coupling and the first walkboard so as to facilitate a comfortable and safe transition from the angled step unit and the first walkboard and vice versa.

The first coupling unit can effectively be implemented as a comb plate with fingers, while the first boardwalk may be provided with grooves, slidingly receiving corresponding fingers of the comb plate. Other implementations of the first coupling unit can be realized as well, e.g. using a telescoping mechanism.

Here, the comb plate is preferably provided at an end of the second walkboard overlapping the first walkboard. Further, the second coupling member may be provided on the first walkboard being overlapped by the second walkboard.

However, in principle, the first and second coupling members can be realized the other way around.

Preferably, the translating coupling unit is arranged at the end of the second walkboard overlapping the first walkboard. Then, the translating coupling unit can also be arranged on a side of the angled step unit facing the second walkboard. However, alternative implementations are feasible. As an example, the translating coupling unit may be provided at an intermediate portion of the angled step unit.

In an advantageous embodiment, the translating coupling unit includes elastic material allowing a movement of the first and second walkboards relative to each other in a direction transverse to the longitudinal direction. Alternative or additionally, the translating coupling unit may include a movable or hingeable structure, which is for example biased to a balance position, e.g. using a resilient or pressured structure.

Further, in a specific embodiment, the first walkboard includes a single or a multiple number of removable plank plates, such as removable gratings, that are provided with a multiple number of grooves running in the longitudinal direction for slidingly receiving corresponding fingers of the comb plate. Then, the plank plates can be replaced easily in case of damage or wear.

The invention further relates to a motion compensated gangway comprising a movable transition deck and a telescopic gangway connected to the transition deck, which gangway comprises a first and second gangway part, for example a telescoping and main boom, which are telescopable with respect to each other in a longitudinal direction to adjust a longitudinal length of the telescopic gangway, wherein the first gangway part has a first walkboard, such as a first grating, and the second gangway part has a second walkboard, such as a second grating, that partially overlaps the first walkboard, the gangway further comprising a angled step unit providing a transition from the first walkboard to the second walkboard, such that the first walkboard, the second walkboard and the angled step unit form an assembled walkboard path, wherein the angled step unit has a first coupling unit that that is coupled to the first walkboard for allowing a movement in the longitudinal direction, and wherein the angled step unit has a translating coupling unit that is coupled to the second walkboard, preferably for allowing a movement in a direction transverse to the longitudinal direction.

Motion compensated gangways per se, such as for compensating for vessel motions when transferring personnel and/or loads are known in the art. For example from the Ampelmann® system as disclosed in general in NL1027103, or systems disclosed in WO2012/138227 and WO2013/10564.

NL1027103 discloses a vessel with a Stewart type construction for compensating motions of a ship. The construction comprises a transition deck, borne on six hydraulic cylinders, and motion sensors. During use, with the aid of the sensors, the motions of the vessel are measured. With the aid of these measurements, the orientation and/or position of the cylinders is driven continuously so that the transition deck remains approximately stationary relative to the fixed world. A luffing gangway is connected to the transition deck. In this manner, motions of the vessel are compensated and for instance people or loads can be transferred from the vessel onto a stationary offshore construction, or vice versa.

The invention also relates to a vessel, comprising a motion compensated gangway including a movable transition deck and a telescopic gangway connected to the transition deck, which gangway comprises a first and second gangway part, for example a telescoping and main boom, which are telescopable with respect to each other in a longitudinal direction to adjust a longitudinal length of the telescopic gangway, wherein the first gangway part has a first walkboard, such as a first grating, and the second gangway part has a second walkboard, such as a second grating, that partially overlaps the first walkboard, the gangway further comprising a angled step unit providing a transition from the first walkboard to the second walkboard, such that the first walkboard, the second walkboard and the angled step unit form an assembled walkboard path, wherein the angled step unit has a first coupling unit, such as a comb plate, that is coupled to the first walkboard for allowing a movement in the longitudinal direction, and wherein the angled step unit has a translating coupling unit that is coupled to the second walkboard, preferably for allowing a movement in a direction transverse to the longitudinal direction.

Additionally, the invention relates to an offshore construction, comprising a motion compensated gangway including a movable transition deck and a telescopic gangway connected to the transition deck, which gangway comprises a first and second gangway part, for example a telescoping and main boom, which are telescopable with respect to each other in a longitudinal direction to adjust a longitudinal length of the telescopic gangway, wherein the first gangway part has a first walkboard and the second gangway part has a second walkboard that partially overlaps the first walkboard, the gangway further comprising a angled step unit providing a transition from the first walkboard to the second walkboard, such that the first walkboard, the second walkboard and the angled step unit form an assembled walkboard path, wherein the angled step unit has a first coupling unit, such as a comb plate, that is coupled to the first walkboard for allowing a movement in the longitudinal direction, and wherein the angled step unit has a translating coupling unit that is coupled to the second walkboard, preferably for allowing a movement in a direction transverse to the longitudinal direction.

Also, the invention relates to a method of modifying a telescopic gangway, comprising a first and second gangway part, for example a telescoping and main boom, which are telescopable with respect to each other in a longitudinal direction to adjust a longitudinal length of the telescopic gangway, wherein the first gangway part has a first walkboard, such as a first grating, and the second gangway has a second walkboard, such as a second grating, that partially overlaps the first walkboard, the method comprising a step of providing an angled step unit providing a transition from the first walkboard to the second walkboard, such that the first walkboard, the second walkboard and the angled step unit form an assembled walkboard path, wherein the angled step unit has a first coupling unit, such as a comb plate, that is coupled to the first walkboard for allowing a movement in the longitudinal direction, and wherein the angled step unit has a translating coupling unit that is coupled to the second walkboard, preferably for allowing a movement in a direction transverse to the longitudinal direction.

Advantageously, the first coupling unit is provided as a comb plate having fingers, and the first walkboard is provided with grooves slidingly receiving corresponding fingers of the comb plate so as to realize an elegant implementation of a first coupling unit that allows a movement in the longitudinal direction.

Preferably, the first walkboard includes a single or a multiple number of removable plank plates, such as removable gratings. Then, the method may further comprise a step of replacing a plank plate by another plank plate that is provided with a multiple number of grooves running in the longitudinal direction forming at least partially the second coupling member for slidingly receiving corresponding fingers of the comb plate, thereby providing a method that can be applied to existing telescopic gangways to advantageously modify them to a telescopic gangway according to the invention.

The terms gangboard and gangplank may be used interchangeably throughout this application. Within the context of this application the term telescopable is meant to be construed as being movable, such as being able to move in and out of each other and/or with respect to each other, e.g. not unlike a telescope.

The invention will be further elucidated on the basis of exemplary embodiments which are represented in the drawings. The exemplary embodiments are given by way of non-limitative illustration of the invention. In the drawings.

In the figures identical or corresponding parts are represented with the same reference numerals. The drawings are only schematic representations of embodiments of the invention, which are given by manner of non-limited examples.

Figure 1:
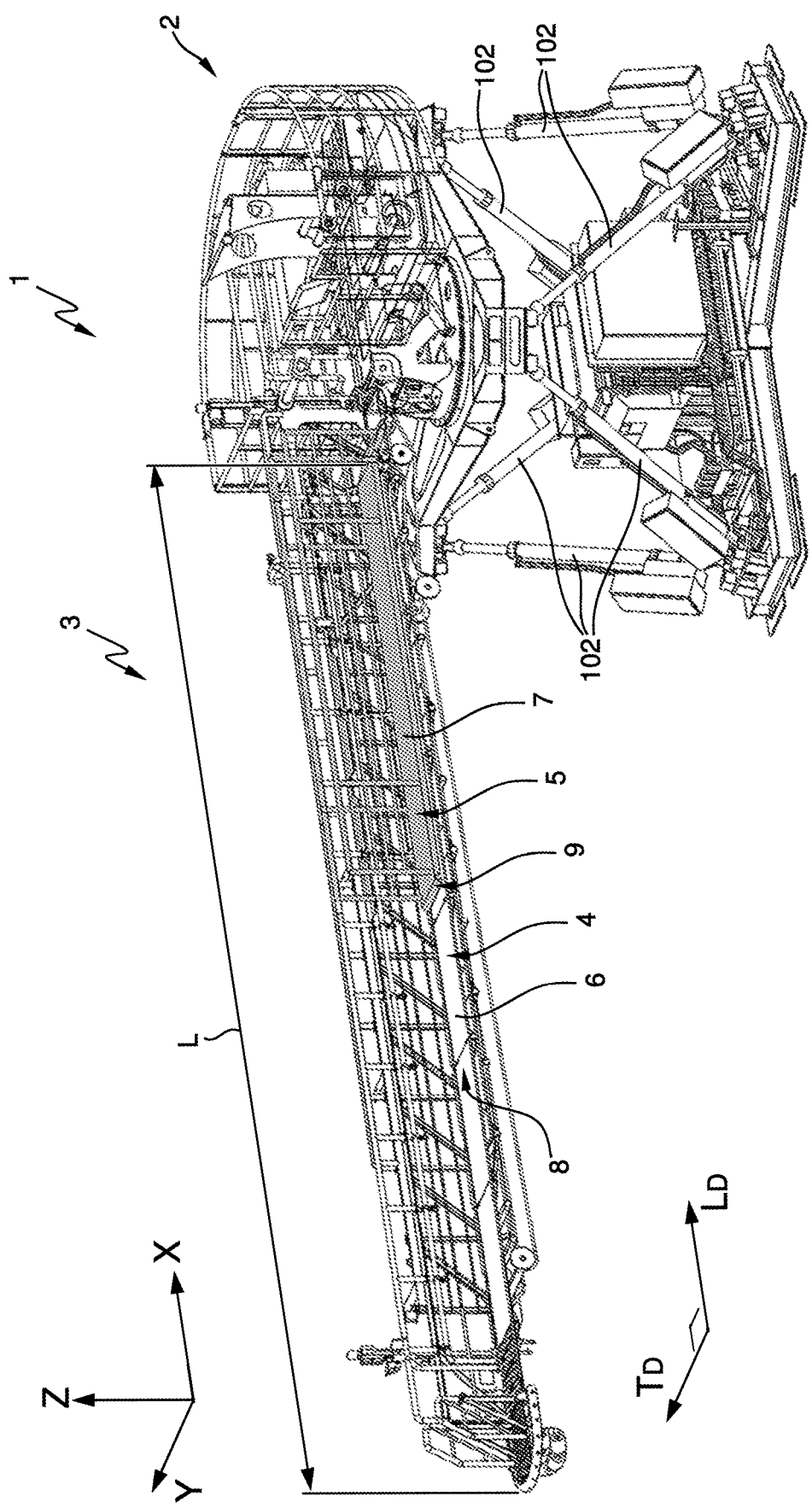
FIG. 1 shows a perspective view of a motion compensated gangway according to the invention.

FIG. 1 shows a perspective view of a motion compensated gangway 1 according to the invention. The motion compensated gangway 1 comprises a movable transition deck 2 and a telescopic gangway 3 connected to the transition deck 2. During operation of the motion compensated gangway 1 a tip of the telescopic gangway 3 may be held in close proximity of an object to or from which a load or a person has to be transferred. The motion compensation system 1 may use actuators, e.g. hydraulic pistons 102, to compensate for relative motion between the object on which the system 1 is mounted and the object to or from which the load/person can be transferred. Said relative motion may for example result from waves or rolling, pitching, and/or yawing motion of a vessel onto which the motion compensated gangway is mounted.

The gangway 3, as depicted in FIG. 1, comprises a first 4 and a second gangway part 5, corresponding to a telescoping and main boom in the shown embodiment, which are telescopable with respect to each other in a longitudinal direction Ld to adjust a longitudinal length L of the telescopic gangway 3. Although the telescopic gangway is depicted in FIG. 1 as part of the motion compensated gangway 1, the invention is by no means limited to this application. In particular, the telescopic gangway 3 may be employed in any situation where a conventional gangway is used. During such use, one end of the gangway 3 is typically held nearby or fixed to one object, and the other end of the telescopic gangway 3 is attached to another object. Furthermore, the motion compensated gangway 1 with the telescopable gangway 3 may be provided on a vessel or on an offshore construction. By providing a telescopable gangway one can accommodate for a change in distance between two objects that are connected by the gangway 3. Such a change in distance may for example result from waves, in which case the typical time scale involved is several seconds, but may also result from tidal motion, for example, if the telescopable gangway 3 connects a moored vessel to the quay, in which case the typical time scale is on the order of hours. Further, the length L of the telescopic gangway may be actively adjusted, for example, by means of actuators, or if the two ends of the telescopic gangway are attached to two objects, the two ends of the telescopic gangway may move freely in the longitudinal direction Ld. In order to allow movement of the first gangway part, here corresponding to the telescoping boom, 4 relative to the second gangway part, here corresponding to the main boom, 5 in the longitudinal direction Ld, the first gangway part 4 may be provided with a rail, and the second gangway part with wheels engaging the rail, or vice versa. Other guiding arrangements are also possible. The gangway 3, as shown in FIG. 1, further comprises a left and a right handrail which a person can hold while traversing the gangway 3.

In FIG. 1, the first gangway part 4 has a first walkboard 6 and the second gangway part 5 has a second walkboard 7 that partially overlaps the first walkboard 6. It is noted that in other embodiments the first walkboard 6 may overlap the second walkboard. For example, the walkboard of the telescoping boom may overlap the walkboard of the main boom. The walkboards 6, 7 may, for example, be implemented as gratings. Preferably, such a grating has holes to allow for rapid drainage of water. These gratings are typically plates with regularly spaced rectangular openings. Also longitudinal bars may form such a grating. In a preferred embodiment the grating plates are removable. Throughout the description also a Cartesian coordinate system with X, Y and Z coordinates is being used. Here, the X axis points along the longitudinal direction Ld of the telescopic gangway 3, the Y axis points in a direction of the gangplank plane normal to the X axis, and the Z axis points in a direction normal to the gangplank plane. The gangway 3 further comprises a angled step unit 9 for forming a transition from the first walkboard 6 to the second walkboard 7. Together, the first walkboard 6, the second walkboard 7 and the angled step unit 9, or the angled step unit surface 17, form an assembled walkboard path 8. Said assembled walkboard path 8 provides a path/supporting surface which the person and/or load can traverse in order to transfer from one object to another object, or vice versa. Viewed along the Y direction the assembled walkboard path 8 is substantially continuous, corresponding to a first substantially horizontal part of the first walkboard 6, and a second substantially horizontal part of the second walkboard 7, which are joined by a substantially continuous interpolating part of the angled step unit 9. The angled step unit 9 includes a first coupling unit 10 that couples the angled step unit 9 to the first walkboard 6, while allowing a movement in the longitudinal direction Ld and a translating coupling unit 11 that couples the angled step unit 9 to the second walkboard 7. Preferably, the translating coupling unit 11 allows for movement between the angled step unit 9 and the second walkboard 7 in a direction transverse Td to the longitudinal direction Ld. In the X, Y, Z coordinate system, said transverse direction corresponds to translational movement in the Y-Z plane, as well as rotational movement around the X, Y or Z axes. Said angled step unit 9 improves the safety of the telescopic gangway, as it lowers the risk that an object gets stuck in between the first 4 and the second gangway part 5.

Preferably, the first coupling unit 10 of the telescopic gangway 3 is arranged for blocking a movement in a direction transverse Td to the longitudinal direction Ld. The blocking of movement in the direction transverse Td to the longitudinal direction Ld may, for example, be obtained by providing the first coupling unit 10 with a first coupling member 12 that is provided with a comb plate 13 with fingers 14, and providing the first walkboard with a second coupling member 15 having grooves 16 that receive the corresponding fingers 14 of the comb plate 13. In particular, the fingers 14 may be slidingly received in the grooves 16 of the second coupling member 15, thereby allowing for movement in the longitudinal direction. Preferably the comb plate 13 and the second coupling member 15 with grooves 16 are substantially conformal to each other. Advantageously, the comb plate 13 is tilted towards the first walkboard 6. In this way, if an object is standing on the first walkboard 6 and the two gangway parts 4, 5 move towards each other, the comb plate 13, and or its fingers 14, will lift the object standing on the first walkboard 6, thereby avoiding the situation that the object gets trapped in between the first 4 and second 5 gangway part. Further, a bottom of the angled step unit may be provided with sliding means to assist in the resistance free movement of the angled step unit relative to the first gangway part in the longitudinal direction. For example, the angled step unit may be provided with wheels that are supported by grooves of the first walkboard.

In FIG. 1, the first coupling member 12 is provided at an end of the second walkboard overlapping or adjoining the first walkboard, and the second coupling member 15 is provided on the first walkboard 6 that is overlapped by or adjoins the second walkboard 7.

Similarly, the translating coupling unit 11 may be arranged at the end of the second walkboard 7 overlapping or adjoining the first walkboard 6. Optionally, the translating coupling unit 11 includes elastic material allowing for movement in a direction transverse to the longitudinal direction. The translating coupling unit 11 may comprise a mounting module including elastic material, such as a mounting block or mounting strip. Then, the translating coupling unit 11 may be mounted via the mounting module to the end of the second walkboard for allowing movement of the comb plate 13 in a direction transverse to the longitudinal direction. Herein, the term movement can correspond to linear/translational movement of the angled step unit 9 with respect to one of the gangway parts 4, 5 or the gangway planks 6, 7 in the Y and/or Z directions. Additionally or alternatively, the translating coupling unit 11 may also accommodate rotational movement, including roll, pitch, and/or yaw motion of the angled step unit 9 relative to one of the gangway parts 4, 5 and/or the walkboards 6, 7, corresponding to rotational movement around the X, Y, and/or Z axes. By providing the elastic material that allows for movement in the direction transverse Td to the longitudinal direction Ld the performance of the telescopic gangway is improved. In particular, the provision of the elastic material ensures that if the first gangway part, e.g. the telescoping boom, 4 and the second gangway 5 part, e.g. the main boom, make a small angle relative to each other, the angled step unit 9 does not get stuck between the first 4 and second gangway part 5, thereby impeding the adjustment of the length L of the gangway 3.

Alternatively or additionally, the translating coupling unit 11 may include a movable or hingeable structure. Such a movable or hingeable structure may be biased to a balance position, for example pressing the angled step unit 9 down and/or pressing the angled step unit 9 in a balanced bias position along the Y axis. For example, the biased movable structure may be implemented by a spring, a piston, and/or a damper. For example, the biased movable structure may be implemented as a pair of pistons 11-1, 11-2 connecting the angled step unit 9 to the second gangway part 5, thereby allowing rotation of the angled step unit 9 relative to the second gangway part 5 around a vertical axis. By connecting the pistons 11-1, 11-2 hingeably to the second gangway part 5, e.g. by means of a ball-and-socket joint, the translating coupling unit 11 can also be rotated around the Y and X axes. Embodiments comprising a single piston are also possible. For example, the translating coupling unit 11 may comprise a central hinge connecting the angled step unit 9 to the second walkboard 7, as well as a piston, spring, and/or damper next to it. Additionally or alternatively the angled step unit 9 may be coupled to the second gangway part 5 by bolt(s) that are mounted in an oversized hole(s) provided at the end of the second gangway part 5, thereby allowing for movement of the angled step unit 9 relative to the second gangway part 5 in a plane transverse to the longitudinal direction.

By including the translating coupling unit 11 which allows for rotational and/or translational movement in a direction transverse Td to the longitudinal direction Ld, the angled step unit 9 will remain substantially aligned with a direction parallel to the longitudinal direction Ld of the first walkboard 6, even when the first walkboard 6 and the second walkboard 7 are not completely aligned.

In a preferred embodiment, the translating coupling unit 11 connects the angled step unit 9 fully cardanically to the second gangway part 5. More preferably, the translating coupling unit 11 connects the angled step unit 9 fully cardanically to the second gangway part 5, and the first coupling unit 10 only allows for movement of the angled step unit 9 relative to the first gangway part 4 in the longitudinal direction Ld.

Preferably, a transition surface 17 of the angled step unit 9 is beveled from the second walkboard 7 towards the first walkboard 6, as shown in FIG. 1. However, other geometries are also possible. In FIG. 1 the angle is close to 45 degrees, but other angles are also possible. Furthermore, the angled step unit surface 17 shown in FIG. 1 is substantially flat, but curved transition surfaces are also possible. The angled step unit surface 17 may be integrally formed with the comb plate 13. The angled step unit surface 17 thereby enables one to smoothly transit from the first walkboard 6 to the second walkboard 7, or vice versa. In particular, the provision of such an angled step unit surface 17 lowers the risk that an object, such as a foot or other body part gets stuck between the first and second walkboards, which may lead to a severe injury. Also, the provision of the angled step unit surface 17 lowers the risk that an object traversing the gangway path may get stuck between the first 4 and second 5 gangway parts, thereby blocking the telescopic movement.

In FIG. 1, the first walkboard 6 includes a single or a multiple number of removable plank plates 6-1, 6-2, 6-3 that are provided with a multiple number of grooves 16 running in the longitudinal direction Ld for slidingly receiving corresponding fingers 14 of the comb plate 13.

Figure 2:
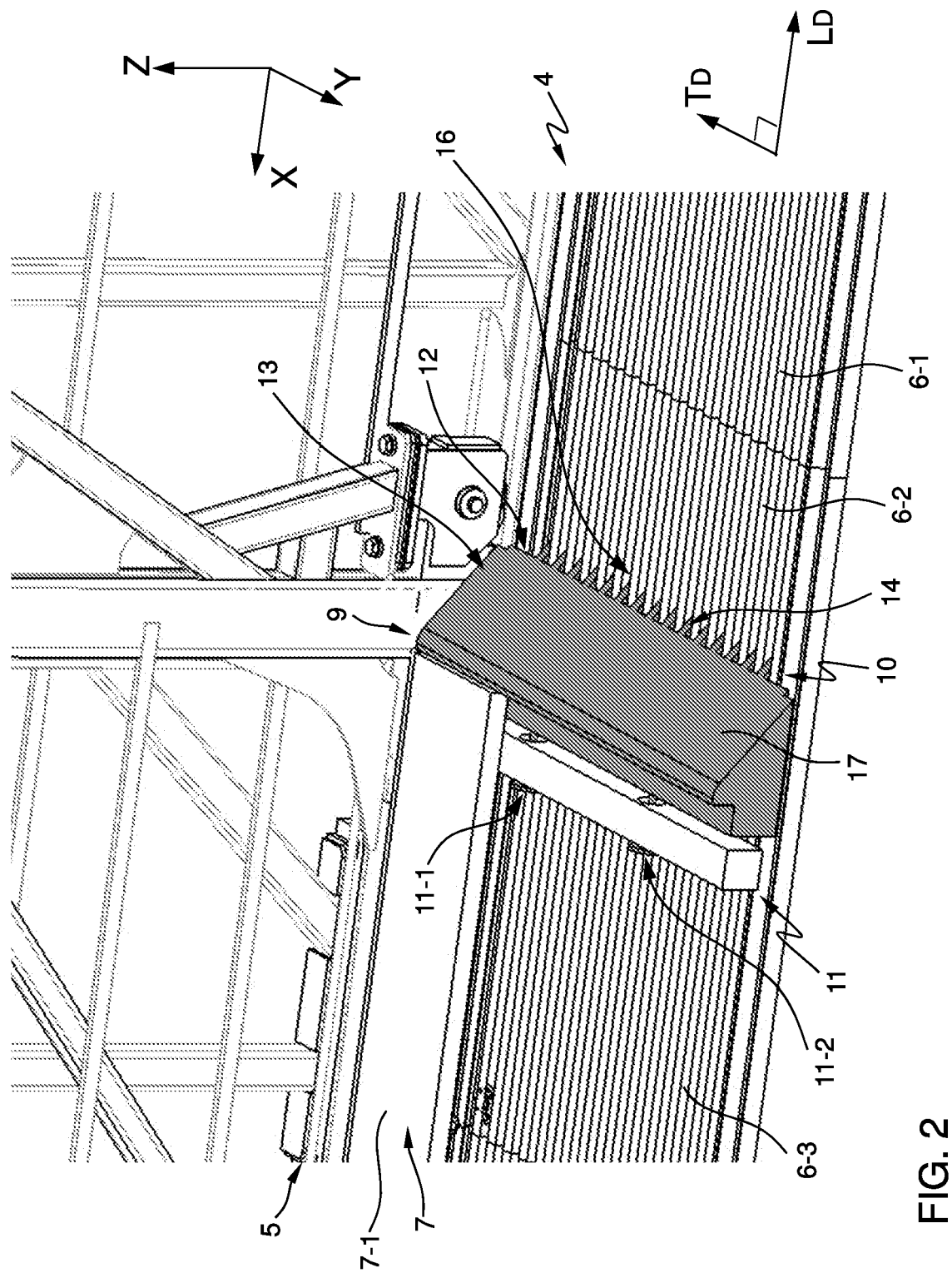
FIG. 2 shows a perspective partial view of a telescopic gangway provided on the motion compensated gangway shown in FIG. 1, the telescopic gangway comprising an angled step unit.

FIG. 2 shows a perspective partial view of a telescopic gangway 3 provided on the motion compensated gangway shown in FIG. 1. The first walkboard 6 comprises a multiple number of gangplank plates 6-1, 6-2 and 6-3 that together form the gangplank 6. Said first walkboard plates 6-1, 6-2 and 6-3 may be removable. The second gangway part 5 shown in FIG. 2, further comprises a wheel that rests on a guiding arrangement of the first gangway part 4, to enable the telescopic movement of the first gangway part 4 relative to the second gangway part 5. The second gangway part 5 includes a second walkboard 7. In FIG. 2, the second walkboard 7 is implemented by longitudinal second walkboard parts 7-1, of which only a single one is shown.

FIG. 2, further shows that the telescopic gangway 3 is provided with a angled step unit 9. Here, the first walkboard 6 of the first gangway part 4 comprises a multiple number of grooves 15 in the longitudinal direction Ld, thus acting as the second coupling member 15 of the first coupling unit 10. The grooves 16 receive the fingers 14 of the comb plate 13. As a result, the angled step unit 9 can slide along the longitudinal direction Ld, whereas movement of the angled step unit 9 transverse to the longitudinal direction Ld in the plane of the first walkboard, i.e. along the Y axis, 6 is blocked.

In FIG. 2, the comb plate 13 and angled step unit surface 17 are integrated. Said angled step unit 9 comprises the first member 12 of the first coupling unit 10 as well as the translating coupling unit 11. The translating coupling unit 11 is embodied as a first 11-1 and a second piston 11-2, thereby enabling rotational movement of the angled step unit 9 with respect to the second gangway part 5 around the Z axis. Alternatively or additionally, an elastic material may be provided as part of the translating coupling unit 11. For example, a rubber element may join the end of the second walkboard 7 and the angled step unit 9.

Figure 3:
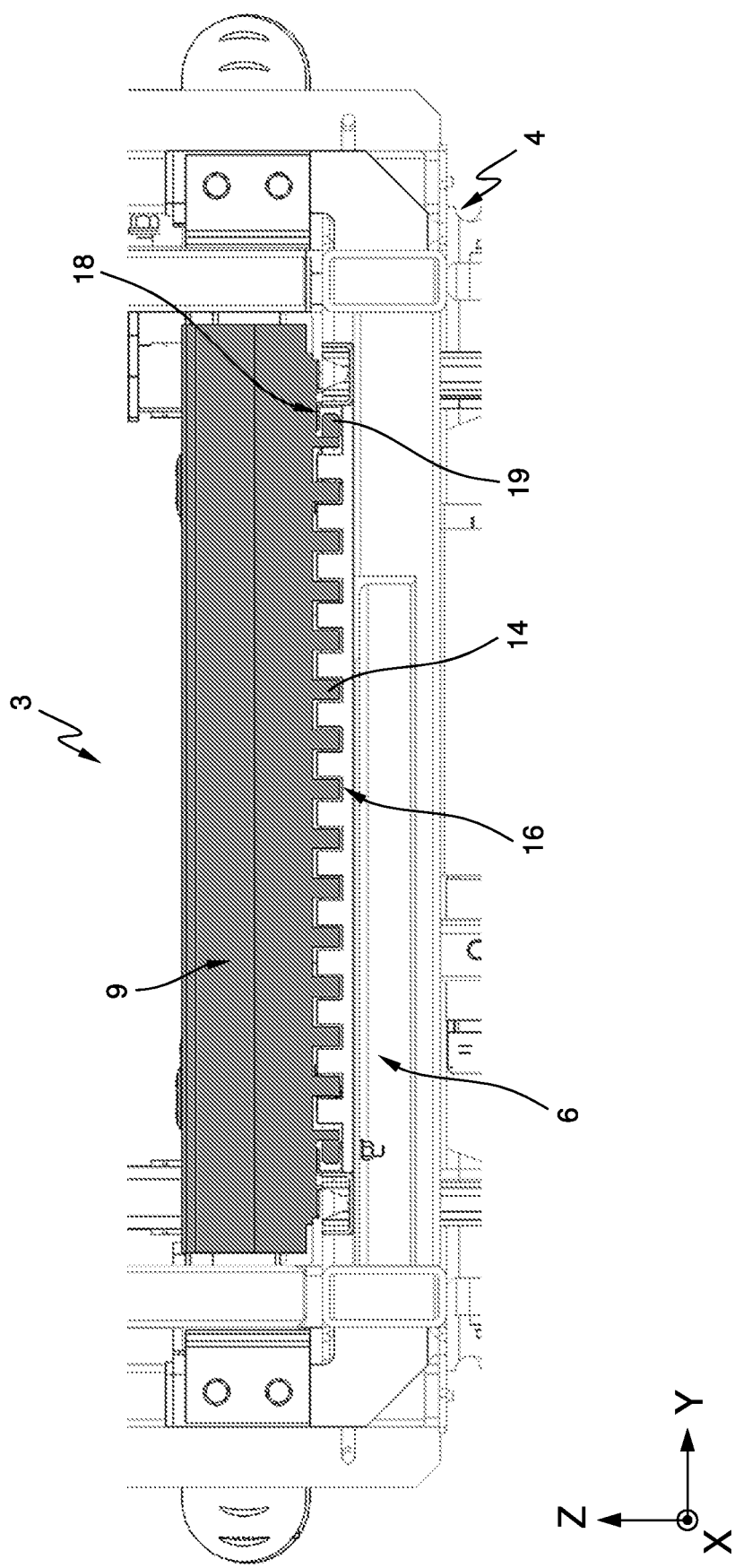
FIG. 3 shows a cross sectional view of the telescopic gangway with angled step unit shown in FIG. 2, at a gangplank overlap thereof.

FIG. 3 shows a cross sectional view in the Y-Z plane of the telescopic gangway 3 shown in FIG. 2, at a gangplank overlap thereof. The grooves 16 in the longitudinal direction Ld of the first walkboard 6 provide recesses into which the fingers 14 of the comb plate 13 are received. The grooves 16 act as a guiding element for the comb plate 13. As the grooves 16 and fingers 14 are substantially conformal, movement of the comb plate in a direction transverse Td to the longitudinal direction Ld in the plane of the first walkboard 6 is blocked, specifically in the Y direction. Furthermore, FIG. 3 shows the optional feature of a angled step unit 9 of which the movement relative to the first walkboard 6 in a vertical direction (along the Z-axis) is limited. Here, this is achieved by providing the outer fingers 14 of the comb plate 13 with outwardly, i.e. along the Y axis, pointing wings 19. Said wings 19 are partially enclosed by C-elements 18 attached to the first walkboard 6, thus blocking movement in any direction transverse to the longitudinal direction Ld. It is noted that said blocking can be obtained in a myriad of other ways. For example, a groove 16 of the first walkboard 6 and a finger 14 of the comb plate 13 may have a trapezoid cross section, when viewed along the longitudinal direction Ld, that are interlocking.

Figure 4:
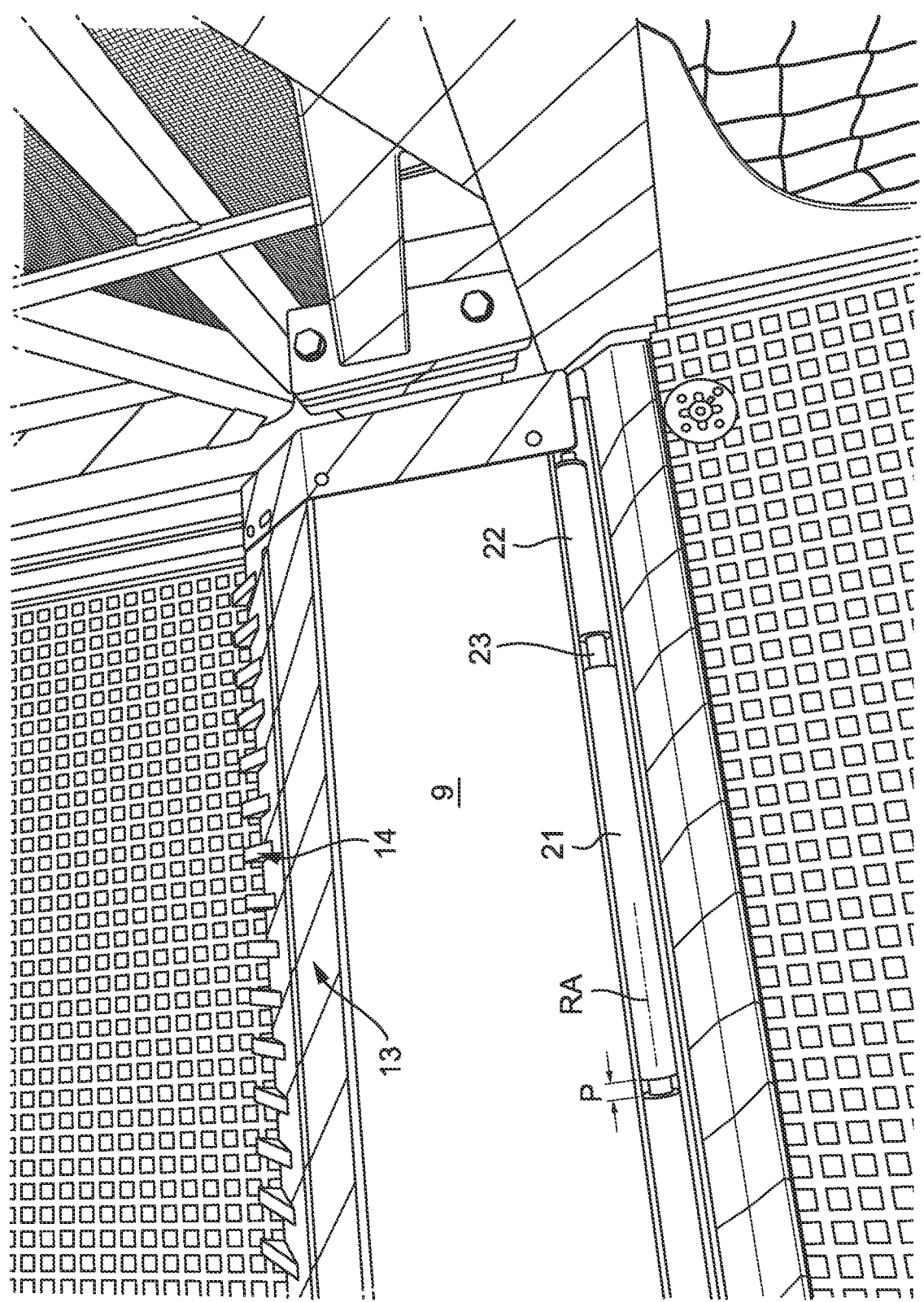
FIG. 4 shows a schematic top view of an another angled step unit.

FIG. 4 shows a schematic top view of an another angled step unit 9 to be used in a telescopic gangway 3 as described above. Again, the angled step unit 9 is provided with a comb plate 13 with fingers 14 to be slidingly received in corresponding grooves 16 of the first walkboard 6 as particularly shown in FIG. 2.

Further, the angled step unit 9 includes a translating coupling unit including a hingeable structure 20 having a rotating axle 23 rotatable around a rotating axis RA that is mainly parallel to the Y-axis, i.e. in a direction of the gangplank plane normal to the X axis that points along the longitudinal direction Ld of the telescopic gangway 3. In an assembled state, a first member 21 of the hingeable structure 20 is mounted to the end of the second walkboard 7, while a second member 22 of the hingeable structure 20, hingeable in respect of the first member 21 of the hingeable structure 20 around the rotating axis RA, is mounted to the comb plate 13, such that the comb plate 13 is allowed to rotate around the rotating axis RA, mainly parallel to the Y-axis.

The hingeable structure 20 has play P in the direction of the Y-axis, thereby allowing the comb plate 13 to move along the Y-axis with respect to the end of the second walkboard 7. Optionally, the hingeable structure 20 may have play in the direction of the Z-axis, or in another direction transverse to the longitudinal direction Ld of the telescopic gangway 3. Further, the hingeable structure 20 may have play in a plane that is transverse to the longitudinal direction Ld of the telescopic gangway 3.

It is noted that instead of the hingeable structure 20, the translating coupling unit may include another movable structure such as a shiftable structure having play in a direction Ld transverse to the longitudinal direction for allowing the comb plate 13 to move into a direction transverse to the longitudinal direction Ld.

Also, a biasing element such as a spring, piston and/or damper can be applied to as to bias the angled step unit 9 to a balanced bias position, e.g. along the Y-axis.

Further, the hingeable structure 20 or any other movable structure may be mounted to the end of the second walkboard 7 via a mounting module including elastic material so as to allow the comb plate 13 to move into a direction transverse to the longitudinal direction Ld, e.g. towards a biased position.

As mentioned above, the telescopic gangway 3 may be part of a motion compensated gangway 1 which includes a movable transfer deck 2 to which the telescopic gangway 3 is connected. The motion compensated gangway may for example be provided on a vessel, to enable the transfer of a load or a person from the vessel to another object, e.g. an offshore platform, a wind turbine, a mono-pile, another vessel or a mooring structure. Alternatively the motion compensated gangway comprising the telescopic gangway may be provided on the offshore construction, the wind turbine, or the mooring structure. Also, a telescopic gangway as described above can be applied for facilitating movement of persons and/or loads from the transfer deck 2 to and/or from a deck of the vessel or other object on which the motion compensated gangway has been mounted, also referred to as "slideway".

Although the telescopic gangway 3 shown in the accompanying FIGS. 1-3 comprises a first 4 and a second gangway part 5, it is noted that the telescopic gangway 3 may comprises more than two gangway parts. For example, the telescopic gangway 3 may comprise a third gangway part, partially overlapping or overlapped by the first 4 or second 5 gangway part.

FIG. 1 shows the telescopic gangway 3 as part of the motion compensated gangway 1, however, as already mentioned above, the invention is by no means limited to motion compensated gangways. In particular, the telescopic gangway 3 can be employed as a conventional gangway between a ship and a wall, a ship and a pontoon, between two ships, and or between two pontoons. The first gangway part, or telescoping boom, may be attached to a fixed object and the second part may be attached to a movable object, or vice-versa. However, also the first gangway part, or telescoping boom, as well as the second gangway part, or main boom, may be attached to two separate moving objects. Furthermore, one of the gangway parts may be integrally formed with the ship, the pontoon, or the wall.

The invention also relates to a method of modifying a telescopic gangway 3. For example, the telescopable gangway 3 of an existing motion compensated gangway 1 which is not provided with a angled step unit 9, may be modified by such a method. Said method of modifying a telescopic gangway 3 includes the step of providing a angled step unit 9 that forms a transition from the first walkboard to the second walkboard, wherein the angled step unit 9 includes a first coupling unit 10 allowing movement in the longitudinal direction Ld, and a translating coupling unit 11, preferably allowing a movement in a direction transverse to the longitudinal direction Ld. Preferably, the first coupling member is provided with a comb plate 13 with fingers 14, and a second coupling member 15 with grooves 16 that slidingly receive corresponding fingers 14 of the comb plate 13. In an even more preferred embodiment, the first walkboard 6 of the telescopable gangway 3 includes a single or a multiple number of removable plank plates 6-1, 6-2, 6-3, as shown in FIG. 2, and the method further comprises a step of replacing a plank plate 6-1, 6-2, 6-3 by another plank plate that is provided with a multiple number of grooves 16 running in the longitudinal direction Ld for slidingly receiving corresponding fingers 14 of the comb plate 13.

It will be clear to the skilled person that the invention is not limited to the exemplary embodiment represented here. Many variations are possible. For example, a vessel may be provided with a motion compensated gangway, in particular a vessel with a column supported on a deck of the vessel, and a gangway comprising features as described above connected to the column, such that the gangway can rotate around a vertical axis of the column and can slew around an axis parallel to the deck. Further, a vessel with a column and a gangway comprising features as described above connected to the column for luffing, wherein the column is connected to deck of the vessel by a two degrees of freedom pivot. Movement of the vessel can be compensated for by at least a combined movement of luffing and pivoting of the column in said pivot.

Such variations shall be clear to the skilled person and are considered to fall within the scope of the invention as defined in the appended claims.

LIST OF REFERENCE SIGNS

L length
Ld longitudinal direction
Td transverse direction
X, Y, Z X, Y, and Z-direction
1. Motion compensated gangway
2. Transfer deck
3. Telescopic gangway
4. First gangway part
5. Second gangway part
6. First walkboard
7. Second walkboard
8. Walkboard path
9. Angled step unit
10. First coupling unit
11. Translating coupling unit
12. First coupling member
13. Comb plate
14. Fingers
15. Second coupling member
16. Grooves
17. Angled step unit surface
18. C-element
19. Wing
20. Hingeable structure
21. First member of hingeable structure
22. Second member of hingeable structure
23. Rotating axle
RA rotating axis
102. hydraulic piston

The invention claimed is:

1. A telescopic gangway, comprising a first and second gangway part which are telescopable with respect to each other in a longitudinal direction to adjust a longitudinal length of the telescopic gangway, wherein the first gangway part has a first walkboard, and the second gangway part has a second walkboard that partially overlaps the first walkboard, the gangway further comprising an angled step unit providing a transition from the first walkboard to the second walkboard, such that the first walkboard, the second walkboard and the angled step unit form an assembled walkboard path, wherein the angled step unit has a first coupling unit that is coupled to the first walkboard for allowing a movement in the longitudinal direction, and wherein the angled step unit has a translating coupling unit that is coupled to the second walkboard, said translating coupling unit including elastic material allowing a movement in a direction transverse to the longitudinal direction.

2. The telescopic gangway according to claim 1, wherein the first coupling unit is arranged for blocking a movement in a direction transverse to the longitudinal direction.

3. The telescopic gangway according to claim 1, wherein the first coupling unit is provided as a comb plate with fingers, and the first walkboard is provided with grooves, slidingly receiving corresponding fingers of the comb plate.

4. The telescopic gangway according to claim 3, wherein the comb plate is provided at an end of the second walkboard overlapping the first walkboard, and wherein the grooves are provided on the first walkboard being overlapped by the second walkboard.

5. The telescopic gangway according to claim 1, wherein the translating coupling unit is arranged at the end of the second walkboard overlapping the first walkboard.

6. The telescopic gangway according to claim 1, wherein the translating coupling unit comprises a mounting module including elastic material, and wherein the translating coupling unit is mounted via the mounting module to the end of the second walkboard.

7. The telescopic gangway according to claim 1, wherein the first coupling unit is formed as a comb plate, wherein the first walkboard includes a single or a multiple number of removable plank plates that are provided with a multiple number of grooves running in the longitudinal direction for slidingly receiving corresponding fingers of the comb plate.

8. A motion compensated gangway comprising a movable transfer deck and the telescopic gangway of claim 1 connected to the movable transfer deck.

9. A vessel or an offshore construction, comprising the motion compensated gangway according to claim 8.

10. A method of modifying a telescopic gangway, comprising a first and second gangway part, which are telescopable with respect to each other in a longitudinal direction to adjust a longitudinal length of the telescopic gangway, wherein the first gangway part has a first walkboard, and the second gangway part has a second walkboard that partially overlaps the first walkboard, the method comprising a step of providing an angled step unit providing a transition from the first walkboard to the second walkboard, such that the first walkboard, the second walkboard and the angled step unit form an assembled walkboard path, wherein the angled step unit has a first coupling unit that is coupled to the first walkboard for allowing a movement in the longitudinal direction, and wherein the angled step unit has a translating coupling unit that is coupled to the second walkboard, said translating coupling unit including (i) elastic material allowing a movement in a direction transverse to the longitudinal direction, or (ii) a movable or hingeable structure that is biased to a balance position.

11. The method according to claim 10, wherein the first coupling unit is provided as a comb plate having fingers, and the first walkboard is provided with grooves, slidingly receiving corresponding fingers of the comb plate.

12. The method according to claim 11, wherein the first walkboard includes a single or a multiple number of removable plank plates, and wherein the method further comprises a step of replacing a plank plate by another plank plate that is provided with a multiple number of grooves running in the longitudinal direction forming at least partially the translating coupling member for slidingly receiving corresponding fingers of the comb plate.

13. The method according to claim 10, wherein the first gangway part is a telescoping boom, and wherein the second gangway part is a main boom.

14. A telescopic gangway, comprising a first and second gangway part which are telescopable with respect to each other in a longitudinal direction to adjust a longitudinal length of the telescopic gangway, wherein the first gangway part has a first walkboard, and the second gangway part has a second walkboard that partially overlaps the first walkboard, the gangway further comprising an angled step unit providing a transition from the first walkboard to the second walkboard, such that the first walkboard, the second walkboard and the angled step unit form an assembled walkboard path, wherein the angled step unit has a first coupling unit that is coupled to the first walkboard for allowing a movement in the longitudinal direction, and wherein the angled step unit has a translating coupling unit that is coupled to the second walkboard, said translating coupling unit including a movable or hingeable structure that is biased to a balance position.

15. The telescopic gangway according to claim 14, wherein the translating coupling unit is coupled to the second walkboard for allowing a movement in a direction transverse to the longitudinal direction.

16. The telescopic gangway according to claim 14, wherein the movable or hingeable structure has play in a direction transverse to the longitudinal direction.

17. A motion compensated gangway comprising a movable transfer deck and the telescopic gangway according to claim 14 connected to the movable transfer deck.

18. A vessel or an offshore construction, comprising the motion compensated gangway according to claim 17.

* * * * *